(12) United States Patent
Hendrix (10) Patent No.: US 11,751,576 B2
(45) Date of Patent: *Sep. 12, 2023

(54) APPARATUS FOR SUPPORTING AND MANEUVERING AN ANIMAL CARCASS

(71) Applicant: NSC Beef Processing, LLC, Baird, TX (US)

(72) Inventor: Gary Steven Hendrix, Abilene, TX (US)

(73) Assignee: NCS Beef Processing, LLC, Baird, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,397

(22) Filed: Sep. 27, 2021

(65) Prior Publication Data

US 2022/0007660 A1 Jan. 13, 2022

Related U.S. Application Data

(63) Continuation of application No. 16/774,753, filed on Jan. 28, 2020, now Pat. No. 11,129,391.

(51) Int. Cl.
| A22B 5/00 | (2006.01) |
| A22B 5/06 | (2006.01) |
| A22B 7/00 | (2006.01) |
| A22B 5/20 | (2006.01) |

(52) U.S. Cl.
CPC ............. *A22B 5/06* (2013.01); *A22B 5/202* (2013.01); *A22B 7/008* (2013.01)

(58) Field of Classification Search
CPC .................................. A22B 5/06; A22B 7/008
USPC .......................................................... 452/185
See application file for complete search history.

(56) References Cited

U.S. PATENT DOCUMENTS

| 5,205,779 A | 4/1993 | O'Brien | |
| 6,244,951 B1* | 6/2001 | Leining | A22B 7/003 |
| | | | 452/187 |
| 6,682,412 B2* | 1/2004 | Hendrix | A22B 7/003 |
| | | | 452/187 |
| 11,129,391 B2* | 9/2021 | Hendrix | A22B 5/202 |
| 2003/0153258 A1 | 8/2003 | Hendrix | |
| 2008/0274682 A1* | 11/2008 | Iversen | A22B 5/0029 |
| | | | 452/185 |
| 2018/0042247 A1 | 2/2018 | Lopez | |

* cited by examiner

*Primary Examiner* — Richard T Price, Jr.
(74) *Attorney, Agent, or Firm* — Laubscher & Laubscher PC (57) ABSTRACT

An apparatus for supporting and maneuvering an animal carcass includes a frame and a carcass holding device connected with the frame. The carcass holding device includes a gear assembly, a pair of support arms, and a pair of plates connected with the support arms. The support arms each have a first end connected with the gear assembly and a second end with which the plates are connected. The gear assembly is operable to displace the plates between a retracted position in which the plates may be inserted into an animal carcass rib cage, and an expanded position wherein the plates engage the rib cage to secure the animal carcass for butchering. The frame is adjustable to provide linear displacement and rotation of the carcass holding device.

7 Claims, 7 Drawing Sheets

APPARATUS FOR SUPPORTING AND MANEUVERING AN ANIMAL CARCASS

This application is a continuation of the Hendrix U.S. patent application Ser. No. 16/774,753 filed on Jan. 28, 2020, the entire contents of which are incorporated herein by reference.

BACKGROUND OF THE DISCLOSURE

The present disclosure relates generally to an apparatus for holding an animal carcass and more specifically to an apparatus for supporting and arranging the carcass at different heights and angles allowing for butchering of a carcass.

When an animal carcass, such as a cow, is prepared for butchering, typically the breastbone is cut, the internal organs are removed, and then the carcass is split and cooled.

Most methods of butchering involve hanging the carcass vertically by two limbs and cutting the breastbone to remove internal organs. The carcass is then split along the backbone, splitting the beef in half, which makes it easier to handle the carcass. However, this causes meat contamination through spinal cord exposure.

There are multiple methods for supporting and arranging a cow carcass during the butchering process, such as with a beef spreading device. Such devices might include, hooks, rib spreaders, and hanging devices, to name a few. For all of these methods, the backbone on the carcass must be split. The carcass needs to be cooled for food safety reasons and the backbone is typically split because of the advantages to butchering the carcass and the increased rate at which the carcass will cool. For instance, by splitting the backbone and dividing the carcass in two pieces, each piece can then be more easily butchered on a table. Further by splitting the carcass in two, more surface area of the carcass is exposed to air, increasing the rate at which the carcass is cooled. There are drawbacks, however, to such processes.

Further, requiring the carcass to be cooled prior to fabrication of the primal cuts, makes the meat harder and more difficult to debone and puts more stress on the butchers which can result in hand injuries such as carpel tunnel syndrome.

By splitting the backbone, the spinal cord is also split in half, causing meat contamination. To counteract this, time and money is put into decontamination methods to ensure the resultant beef is safe to eat, with little in the way of satisfactory results.

Thus, there is a need for a device used in butchering an animal carcass that provides for quicker cooling of the carcass as well as for removing all risks associated with splitting the backbone of a carcass.

SUMMARY OF THE DISCLOSURE

Accordingly, it is an object of the present disclosure to provide an apparatus for supporting an animal carcass that will cool the carcass more quickly, that reduces the risk of contamination, and that reduces strain on butchers. Such an apparatus includes a frame and a carcass holding device connected with the frame. The carcass holding device includes a gear assembly, a pair of support arms, and a pair of plates connected with the support arms. The support arms each have a first end connected with the gear assembly and a second end with which the plates are connected. The gear assembly is operable to displace the plates between a retracted position in which the plates may be inserted into an animal carcass rib cage, and an expanded position wherein the plates engage the rib cage to secure the animal carcass for butchering. Preferably, the frame is adjustable to provide linear displacement and rotation of the carcass holding device.

In a preferred embodiment, the gear assembly includes a rotatable worm drive with which the support arm first ends are pivotally connected for linear displacement along the worm drive. This displaces the plates between the retracted and expanded conditions.

In another embodiment, the frame includes a piston and cylinder for linear displacement of the carcass holding device and a rotatable device connected between the piston and cylinder and the carcass holding device for rotation of the carcass holding device. Preferably, the rotatable device includes a gear assembly having a rotatable shaft or a piston and cylinder.

In yet another embodiment, a carcass stabilizer is connected with a side wall of the carcass holding device. Preferably, the stabilizer is an elongated cylindrical device with two telescoping shafts, a set screw and a lower end hook.

BRIEF DESCRIPTION OF THE FIGURES

Other objects and advantages of the disclosure will become apparent from a study of the following specification when viewed in the light of the accompanying drawing, in which.

DETAILED DESCRIPTION

The present disclosure relates to an apparatus for supporting and maneuvering an animal carcass for use while butchering the carcass. The apparatus disclosed herein is described at times in reference to use with a cow. It will be understood by those with skill in the art that the apparatus can also be used in the processing application of other animals, for instance with hogs, pigs, sheep, goats, and deer.

Referring to FIGS. 1-4, the apparatus 2 includes a frame 4 and a carcass holding device 6 connected with the frame. The frame 4 includes a linear displacement device 8 and a rotation device 10. The linear displacement device 8 provides linear displacement of the carcass holding device 6 via a piston and air cylinder 12, while the rotation device 10 provides rotation of the carcass holding device via a motor 14 and internal rotatable shaft 16. The linear displacement device 8 is connected with the rotation device 10, and the rotation device connected with the carcass holding device 6 via connection plates 18. The carcass holding device 8 includes a gear assembly 20 arranged within a housing 22 of the device 8, a pair of support arms 24 connected with the gear assembly, and a pair of plates 26 connected with the support arms.

Figure 5:
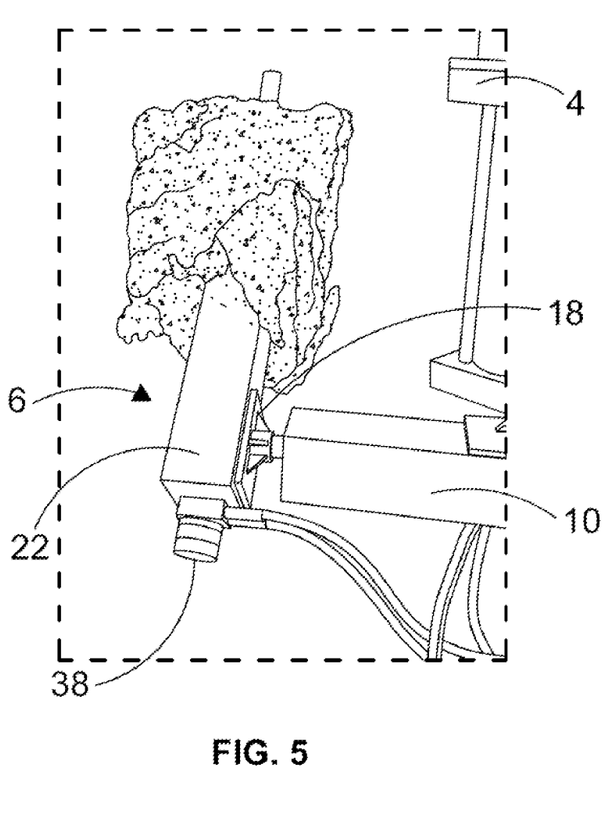
FIG. 5 is a perspective view of an animal carcass secured with the apparatus of the present disclosure.

In operation, the gear assembly 20 displaces the plates 26 between a retracted position in which the plates may be inserted into an animal carcass rib cage and an expanded position wherein the plates engage the rib cage to secure the animal carcass for butchering, as shown in FIG. 5. The linear displacement device 8 provides linear displacement of the carcass holding device 8 to lower or raise a carcass, and the rotation device 10 provides rotation of the carcass holding device 8 to adjust the angle of the carcass. The frame 4 and carcass holding device 6 are controlled via an air actuator valve 28 connected with the apparatus and via switches 30 arranged on the linear displacement device 8. It will be understood by those of skill in the art that other methods of power may be used to provide linear displacement and rotation of the carcass holding device without deviating from the pertinent elements and purpose of the apparatus. For example, as with the hydraulic assembly 132 shown in FIG. 6. Further, linear displacement and rotation may be provided by devices other than the piston and cylinder and/or motor and shaft.

One advantage of the apparatus disclosed herein is that an animal carcass can be immediately butchered while hot, reducing a significant amount of time from the entire butchering process. Rather than first cooling the carcass, the cow is butchered on the apparatus and cooled after all the beef cuts have been completed. This results in a total butcher to truck time of approximately seven hours, significantly less than the three-day industry standard. Further, the apparatus with spreading plates allows a cow to be butchered without splitting the breastbone and backbone. This reduces time and effort needed to butcher a cow, and also removes the risk of spinal cord contamination. Lastly, by butchering the cow while it is still hot or warm, injuries to those butchering the cow, such as carpal tunnel syndrome, will be reduced because a hot carcass is easier to butcher and debone than a cold carcasses.

Figure 1:
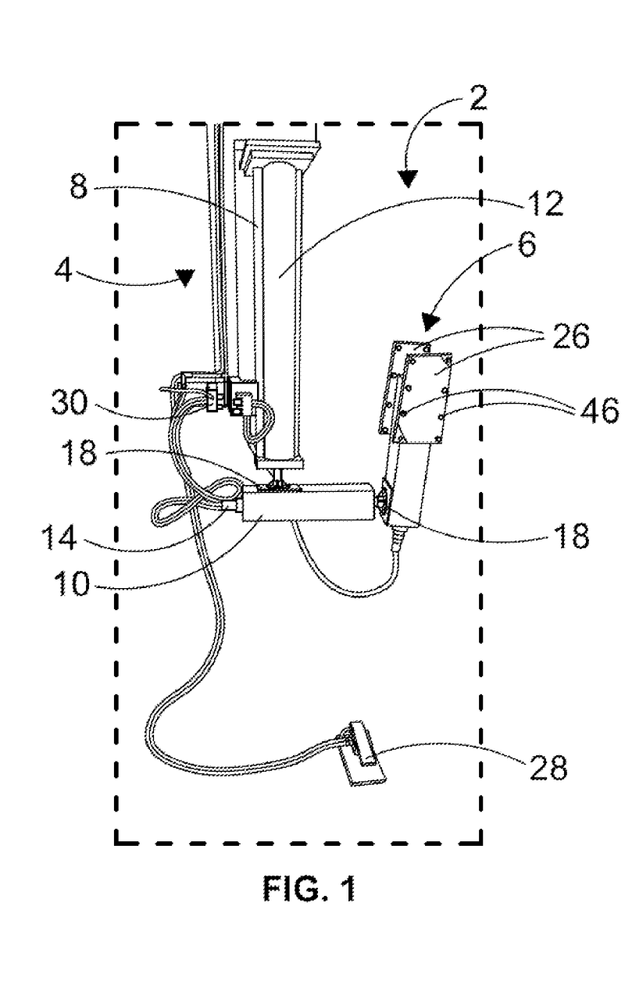
FIGS. 1 and 2 are front and detailed perspective views, respectively, of a first embodiment of an apparatus for supporting and maneuvering an animal carcass according to the present disclosure.
Figure 2:
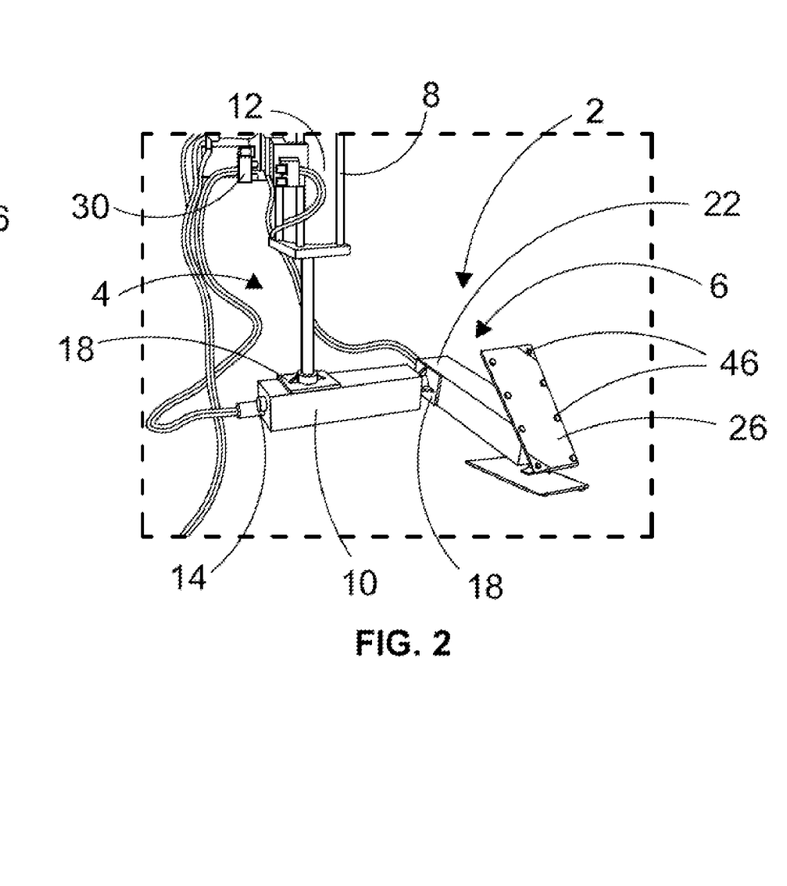
Figure 3:
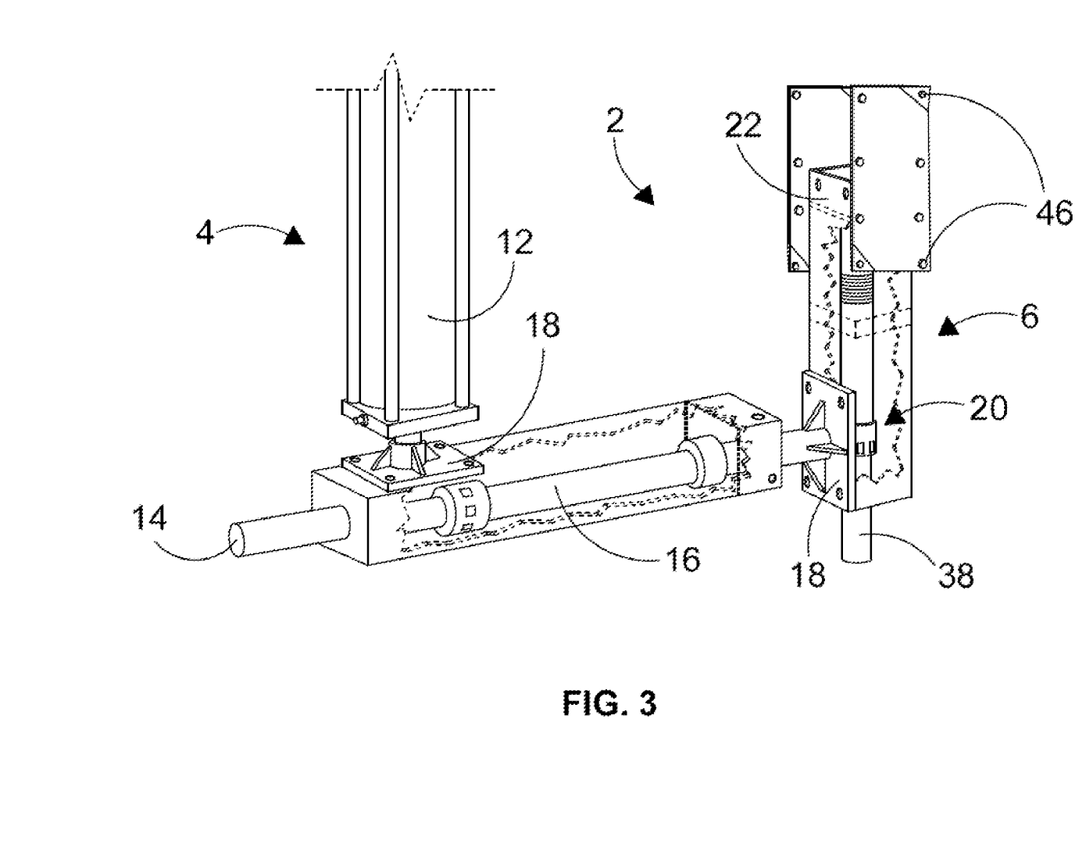
FIG. 3 is a perspective view with a cutaway portion of the frame and carcass holding device of FIGS. 1 and 2.
Figure 4:
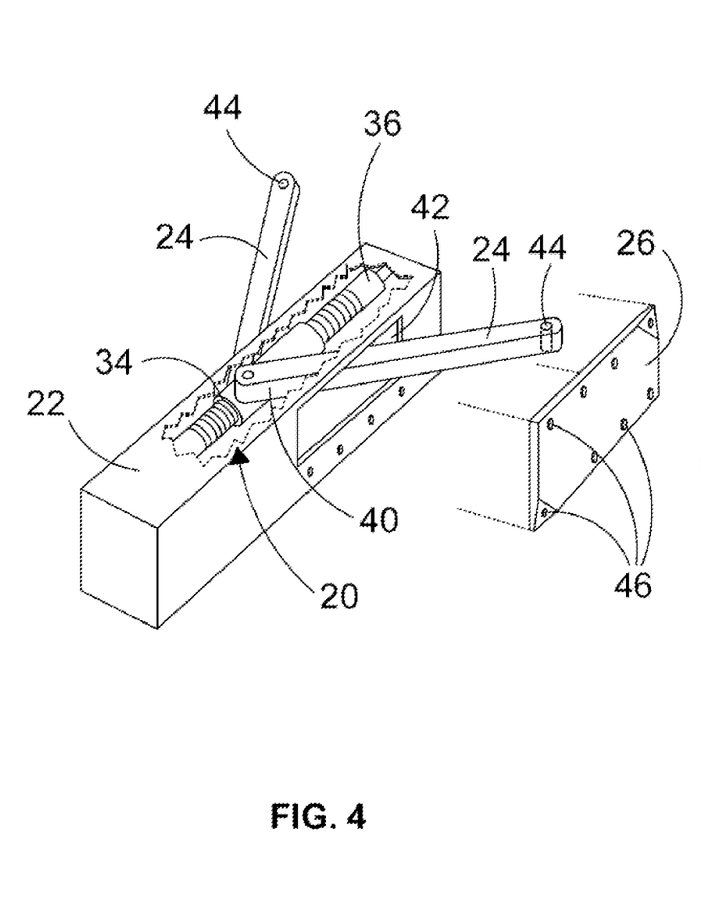
FIG. 4 is perspective cutaway view of a portion of the carcass holding device of FIGS. 1-3.

Referring now to FIGS. 3 and 4, the previously described embodiment of the carcass holding device is shown in detail. The gear assembly 20 includes a worm gear 34 and associated shaft 36 arranged within the device housing 22 that is operated via a motor 38. The first ends 40 of the support arms 24 are pivotally connected with the gear assembly 20 on opposite sides of the worm gear shaft 36. The support arms extend through openings 42 in sides of the housing 22 and connect at a second end 44 with the pair of plates 26. The worm gear 34 is operated via the motor 38 for linear displacement of the support arm first ends 40, resulting in displacement of the spreading plates 26 between retracted and expanded conditions. The plates include spikes 46 arranged near edges of the plates in spaced relation which engage with a carcass when the spreading plates are inserted into the carcass to prevent the carcass from sliding on the spreading plates.

Figure 6:
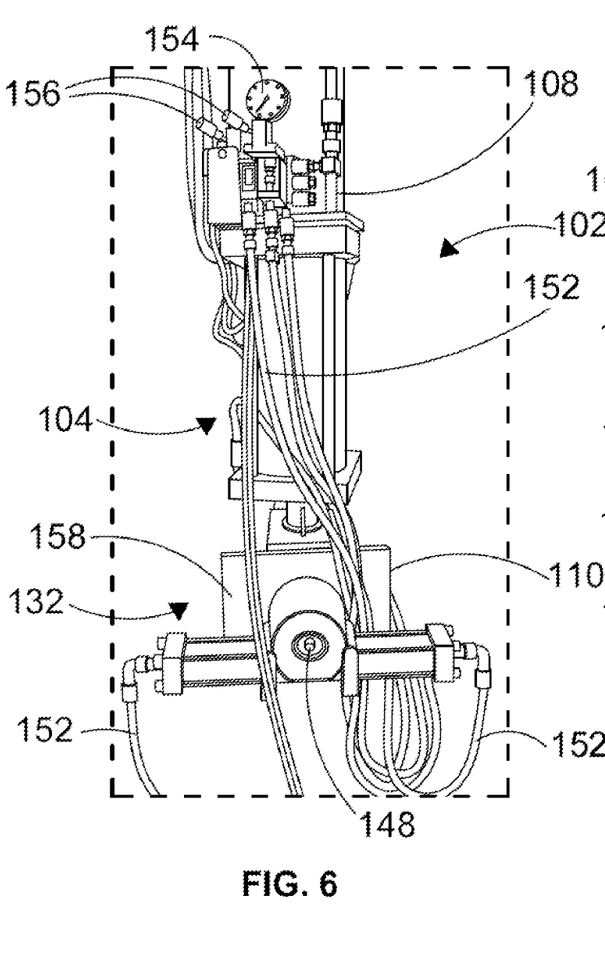
FIGS. 6 and 7 are front and detailed perspective views of a second embodiment of an apparatus for supporting and maneuvering an animal carcass according to the present disclosure.
Figure 7:
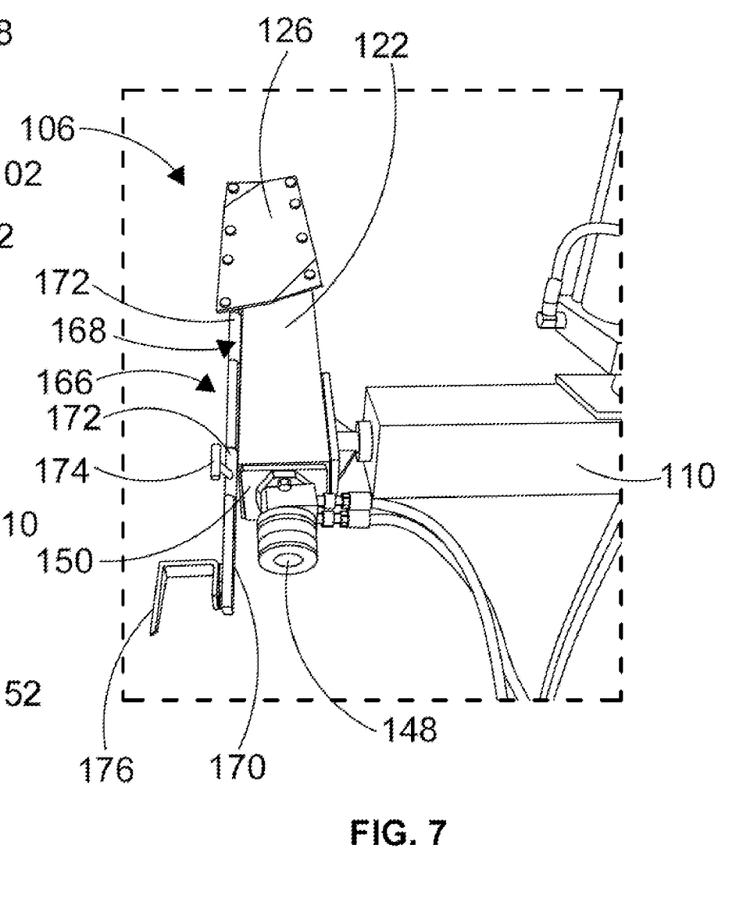

Referring now to FIGS. 6 and 7, a second embodiment of the apparatus 102 is shown. As with the embodiment described above, there is a frame 104 and carcass holding device 106. The frame includes a linear displacement device 108 for linear displacement of the carcass holding device 106 and a rotation device 110 for rotation of the carcass holding device. Rotation via the rotation device, as well as expansion and retraction of the spreading plates 126 is provided by hydraulic assemblies 132. FIG. 6 shows the entire hydraulic assembly 132, including the hydraulic motor 148, hoses 152, gauges 154 and switches 156, connected with a rear end 158 of the rotation device 110 and with the linear displacement device, respectively. FIG. 7 shows the hydraulic motor 148 attached to the bottom end 150 of the carcass holding device. The hydraulic assemblies provide the power necessary to operate the rotation device 110 and carcass holding device 106. For the carcass holding device, the hydraulic motor operates a gear assembly (not shown), causing the spreading plates 126 to retract or expand. The hydraulic assembly attached to the rotation device 110 rotates an internal shaft (not shown), which in turn rotates the carcass holding device that is attached with the rotation device.

Figure 8:
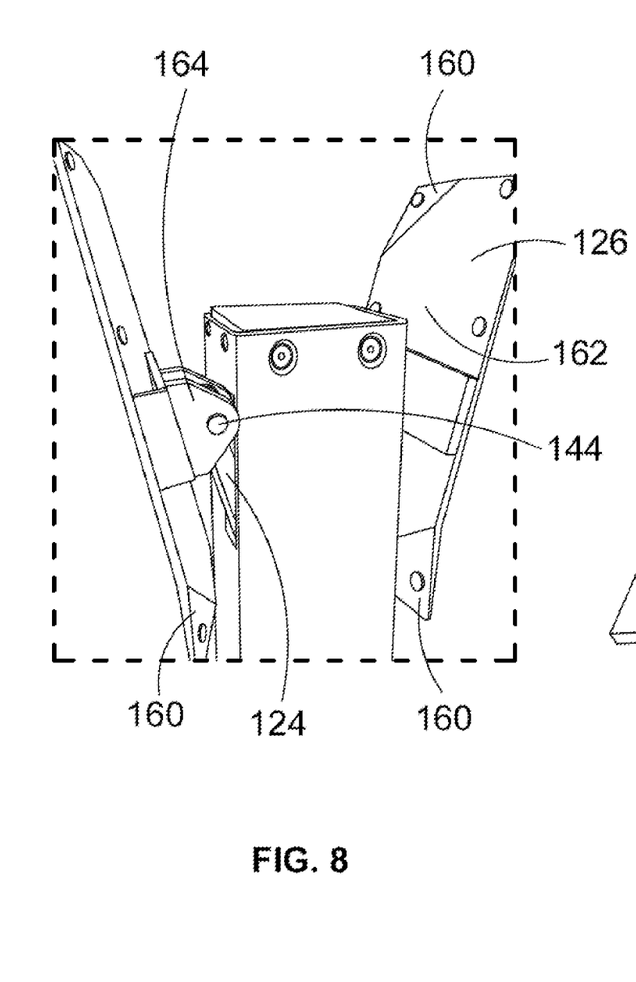
FIGS. 8-10 are perspective views of spreading plates in different positions, respectively, according to the embodiment of FIGS. 6 and 7.
Figures 9, 10:
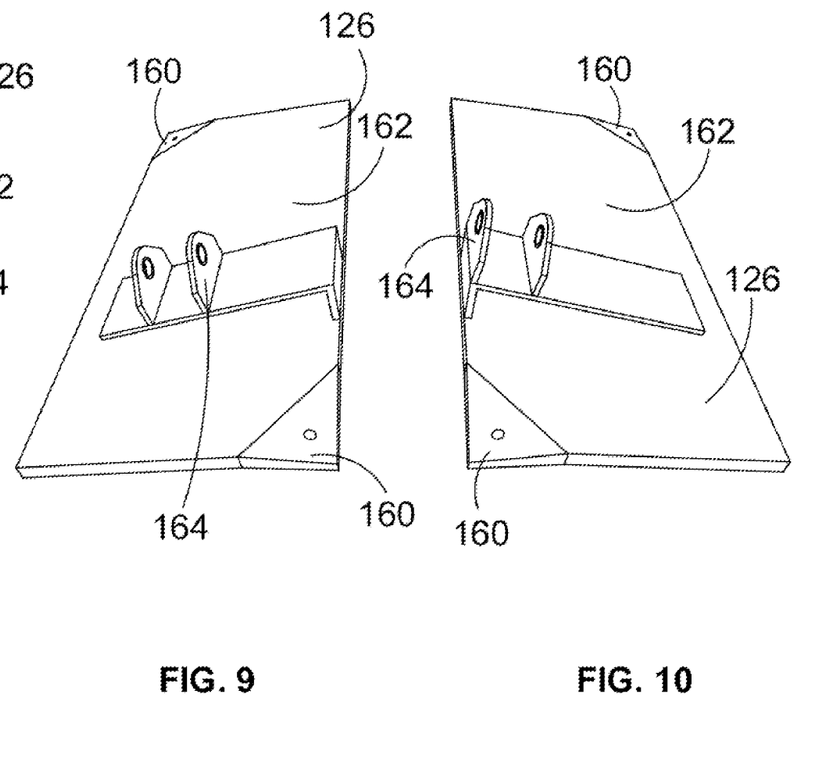

FIGS. 8-10 show the spreading plates 126 of the second embodiment in detail. Each plate 126 has a generally rectangular configuration with two angled corner edges 160 located diagonally opposite one another. The edges angle outwardly relative to the back 162 of each plate 126. Each spreading plate 126 has a connection bracket 164 connected to the plate at an approximately ten-degree angle relative to the back 162 of the plate and extending outwardly from the back of the plate. The bracket connects with the second end 144 of the support arms 124. To accommodate the support arms 124 being arranged on opposite sides of the internal shaft, the brackets 164 are arranged at different positions on each plate 126. The angled corner edges 160 provide additional friction between the spreading plates and carcass, reducing the potential of having the carcass move relative to the spreading plates.

Figure 11:
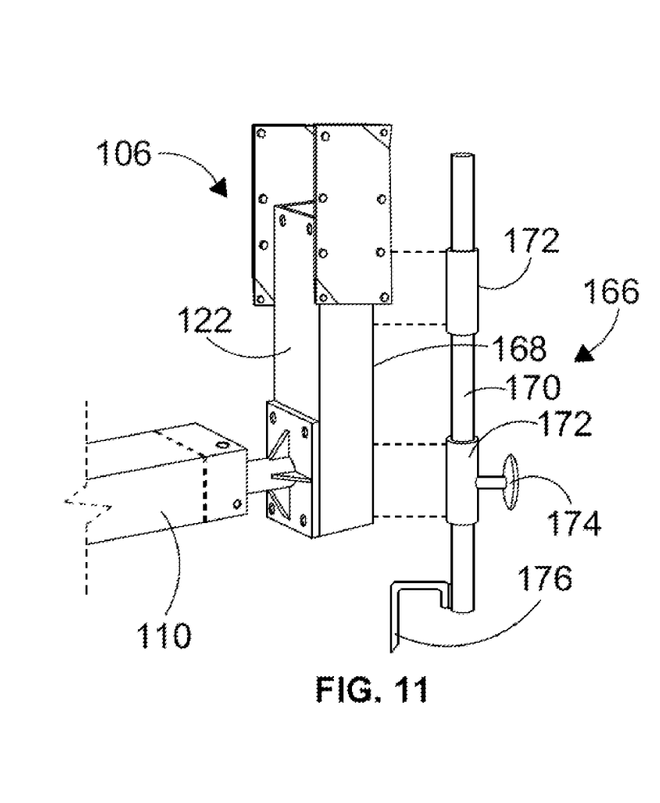
FIG. 11 is a perspective view of the carcass holding device and rotation device from FIG. 7 with the carcass stabilizer removed.

Referring now to FIG. 7 a carcass stabilizer 166 connected with a side wall 168 of the device housing 122 is shown. The carcass stabilizer 166 is connected with the housing side wall 168 that is opposite that which is connected with the rotation device 110. FIG. 11 shows the stabilizer 166 disconnected from the housing 122. The carcass stabilizer 166 includes a shaft 170 inserted through two cylindrical barrels 172 which are connected with the side wall 168. A set screw 174 secures the shaft in place and a lower end hook 176 stabilizes the carcass.

Figure 12:
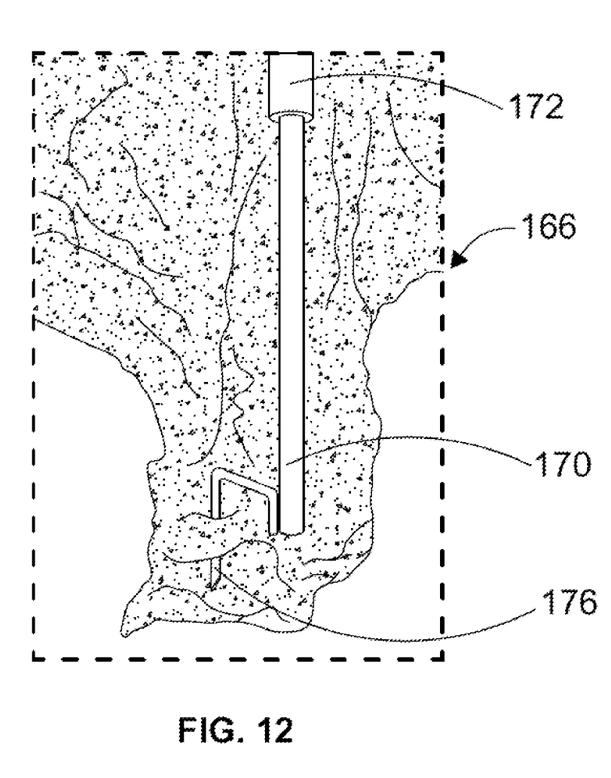
FIG. 12 is a front view of the inner shaft of the carcass stabilizer shown in FIG. 11.
Figure 13:
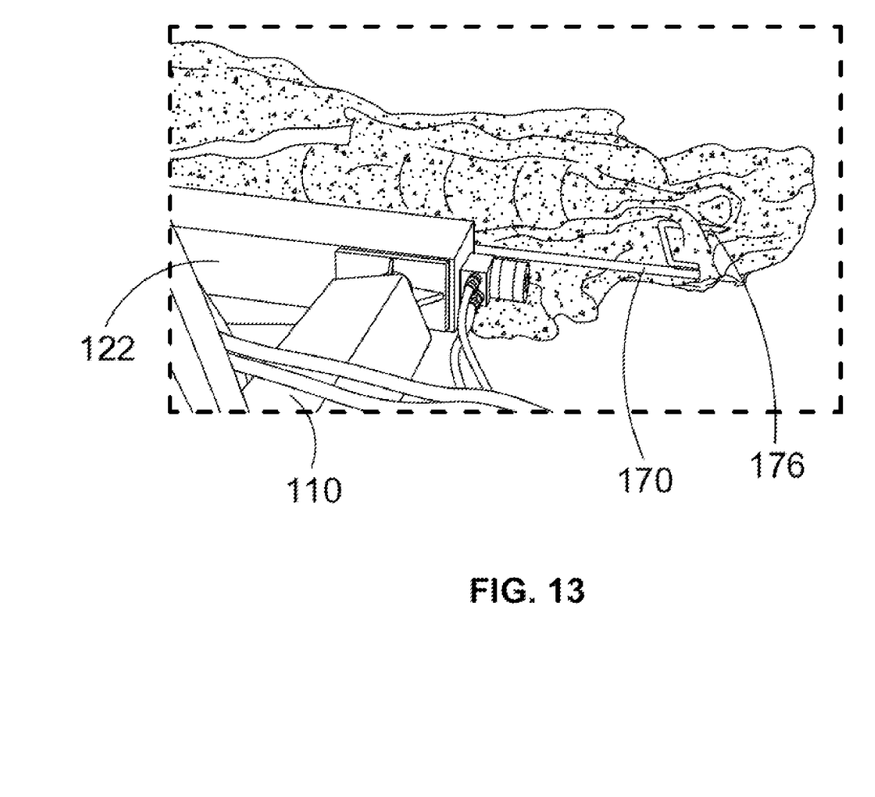
FIG. 13 is a perspective view of a portion of the carcass stabilizer shown in FIG. 11.

FIGS. 12 and 13 show the carcass stabilizer 366 in use. When a carcass is arranged on the carcass holding device 106 and secured via the spreading plates 126, the inner shaft 170 is extended outwardly, lengthening the stabilizer 166, and the set screw is engaged, retaining the stabilizer in its extended state. The hook 176 is connected with an end portion of the carcass, stretching and stabilizing the carcass for more efficient butchering.

Although the above description references particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. An apparatus for supporting an animal carcass, comprising:
   (a) a frame; and
   (b) a carcass holding device connected with said frame and including:
      (1) a linear displacement mechanism;
      (2) a pair of support arms each having a first end connected with said linear displacement mechanism and a second end; and
      (3) a pair of plates connected with said second ends of said pair of support arms, respectively, said linear displacement mechanism being operable to displace said plates between a retracted position in which said plates may be inserted into an animal carcass rib cage and an expanded position wherein said plates engage the rib cage to secure the animal carcass for butchering.

2. An apparatus for supporting an animal carcass as defined in claim 1, and further comprising a housing having a top wall, bottom wall and at least one side wall, said at least one side wall containing a pair of opposing openings through which said pair of support arms extends.

3. An apparatus for supporting an animal carcass as defined in claim 2, wherein said frame is adjustable to provide linear displacement and rotation of said carcass holding device.

4. An apparatus for supporting an animal carcass as defined in claim 3, wherein said frame comprises a piston and cylinder for linear displacement of said carcass holding device.

5. An apparatus for supporting an animal carcass as defined in claim 4, wherein said frame further includes a rotatable device connected between said piston and cylinder and said carcass holding device for rotation of said carcass holding device.

6. An apparatus for supporting an animal carcass as defined in claim 5, wherein said rotatable device includes one of a gear assembly having a rotatable shaft and a piston and cylinder.

7. An apparatus for supporting an animal carcass as defined in claim 1, and further comprising a carcass stabilizer connected with said carcass holding device having at least one shaft and a lower end hook.

\* \* \* \* \*